US010971087B2

(12) United States Patent
Seo (10) Patent No.: US 10,971,087 B2
(45) Date of Patent: Apr. 6, 2021

(54) DISPLAY DEVICE AND METHOD OF DRIVING THE SAME

(71) Applicant: LG DISPLAY CO., LTD., Seoul (KR)

(72) Inventor: Woongjin Seo, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/135,823

(22) Filed: Sep. 19, 2018

(65) Prior Publication Data
US 2019/0096339 A1    Mar. 28, 2019

(30) Foreign Application Priority Data

Sep. 26, 2017 (KR) .......................... 10-2017-0124257

(51) Int. Cl.
| | | |
|---|---|---|
| G09G 3/34 | (2006.01) | |
| G09G 3/00 | (2006.01) | |
| H04N 13/344 | (2018.01) | |
| G09G 5/00 | (2006.01) | |
| G02B 30/24 | (2020.01) | |

(52) U.S. Cl.
CPC ........... *G09G 3/3426* (2013.01); *G02B 30/24* (2020.01); *G09G 3/003* (2013.01); *G09G 5/003* (2013.01); *H04N 13/344* (2018.05); *G09G 2310/0278* (2013.01); *G09G 2340/0435* (2013.01)

(58) Field of Classification Search
CPC ...... G09G 3/3426; G09G 3/003; G09G 5/003; G09G 2310/0278; G09G 2340/0435; G02B 27/2264; H04N 13/00
See application file for complete search history.

(56) References Cited

U.S. PATENT DOCUMENTS

| | | | | |
|---|---|---|---|---|
| 8,780,175 B2 * | 7/2014 | Miyazaki | ............. | H04N 13/398 |
| | | | | 348/43 |
| 2010/0289873 A1 * | 11/2010 | Miyauchi | ............. | H04N 13/139 |
| | | | | 348/43 |
| 2011/0050862 A1 * | 3/2011 | Cheng | .................. | H04N 13/167 |
| | | | | 348/51 |
| 2011/0115789 A1 * | 5/2011 | Kim | ..................... | H04N 13/356 |
| | | | | 345/419 |
| 2011/0285816 A1 * | 11/2011 | Miyazaki | ............. | H04N 13/398 |
| | | | | 348/43 |
| 2012/0002009 A1 * | 1/2012 | Ikuta | ..................... | H04N 13/139 |
| | | | | 348/43 |
| 2012/0105605 A1 * | 5/2012 | Nam | ..................... | H04N 13/341 |
| | | | | 348/51 |
| 2012/0120067 A1 | 5/2012 | Kim et al. | | |
| 2013/0027525 A1 * | 1/2013 | Kitayama | ............ | H04N 13/398 |
| | | | | 348/54 |
| 2016/0035320 A1 * | 2/2016 | Yoon | ........................ | G09G 3/20 |
| | | | | 345/690 |

FOREIGN PATENT DOCUMENTS

KR     10-2012-0053552 A      5/2012

\* cited by examiner

*Primary Examiner* — Patrick N Edouard
*Assistant Examiner* — Eboni N Giles
(74) *Attorney, Agent, or Firm* — Birch, Stewart, Kolasch & Birch, LLP (57) ABSTRACT

According to an aspect of the present disclosure, there is provided a display device including a display panel having a left-eye display area and a right-eye display area, and a timing controller configured to receive video signals having a first frequency to generate video data having a second frequency, where the second frequency is lower than the first frequency.

10 Claims, 5 Drawing Sheets

DISPLAY DEVICE AND METHOD OF DRIVING THE SAME

CROSS-REFERENCE TO RELATED APPLICATIONS

This application claims the priority of Korean Patent Application No. 10-2017-0124257 filed on Sep. 26, 2017, in the Korean Intellectual Property Office, the disclosure of which is incorporated herein by reference.

BACKGROUND

Technical Field

The present disclosure relates to a display device and a method of driving the display device, and more particularly, to a display device and a method of driving the display device that can reduce the driving frequency.

Description of the Related Art

As the information-oriented society evolves, various demands for display devices are ever increasing. Recently, a variety of display devices such as a liquid-crystal display device, a plasma display panel device and an organic light-emitting display device are being used.

Such a display device includes a display panel where data lines and gate lines are arranged and pixels are arranged at the intersections of the data lines and the gate lines. The display device includes a data driver for supplying data voltages to the data lines, a gate driver for supplying gate voltages to the gate lines, and a timing controller for controlling the data driver and the gate driver.

In particular, in order to display a more realistic space, research is recently going on to develop a display panel that is separated into a left-eye display area and a right-eye display area so that different videos for representing virtual reality are output to the left-eye display area and the right-eye display area, respectively.

In a display device implementing such a virtual reality, the data driver receives video data from the timing controller. Then, the video data is converted into an analog data voltage which it is then provided to each of the pixels arranged in the left-eye display area and the right-eye display area.

The video output to the left-eye display area and the video output to the right-eye display area are basically output based on the same original video. Therefore, the data driver outputs the data voltages to the plurality of pixels arranged in the right-eye display area so as to correspond to the data voltages output to the plurality of pixels arranged in the left-eye display area.

Since different data voltages are output to the left-eye display area and the right-eye display area, respectively, there arises a problem that it is difficult to drive the data driver of the display device implementing the virtual reality at a high frequency.

As it is difficult to drive the display device at a high frequency, motion blur or the like can occur, such that the video quality deteriorates.

SUMMARY

In view of the above, an object of the present disclosure is to provide a display device that converts video signals of a high frequency into video data of a low frequency to output it, and a method of driving the same.

Objects of the present disclosure are not limited to the above-mentioned objects, and other objects, which are not mentioned above, can be clearly understood by those skilled in the art from the following descriptions.

According to an aspect of the present disclosure, there is provided a display device including a display panel having a left-eye display area and a right-eye display area, and a timing controller configured to receive video signals having a first frequency to generate video data having a second frequency, where the second frequency is lower than the first frequency.

According to another aspect of the present disclosure, there is provided a method of driving a display device including separating video signals applied from an external system into first video signals to be output to a left-eye display area and second video signals to be output to a right-eye display area, and extending the first video signals to generate first video data to be output to the left-eye display area and extending the second video signals to generate second video data to be output to the right-eye display area.

Other detailed matters of the embodiments are included in the detailed description and the drawings.

According to an embodiment of the present disclosure, the video data having a frequency lower than the frequency of the video signals applied from an external host system is output, so that the driving frequency of the data driver receiving the video data can be reduced as well. As a result, even through the display device is driven at a low frequency, a video quality comparable to that achieved by the display device driven at a high frequency can be perceived.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Advantages and characteristics of the present disclosure and a method of achieving the advantages and characteristics will be clear by referring to embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to embodiments of the present disclosure will be described in detail with reference to accompanying drawings.

Figure 1:
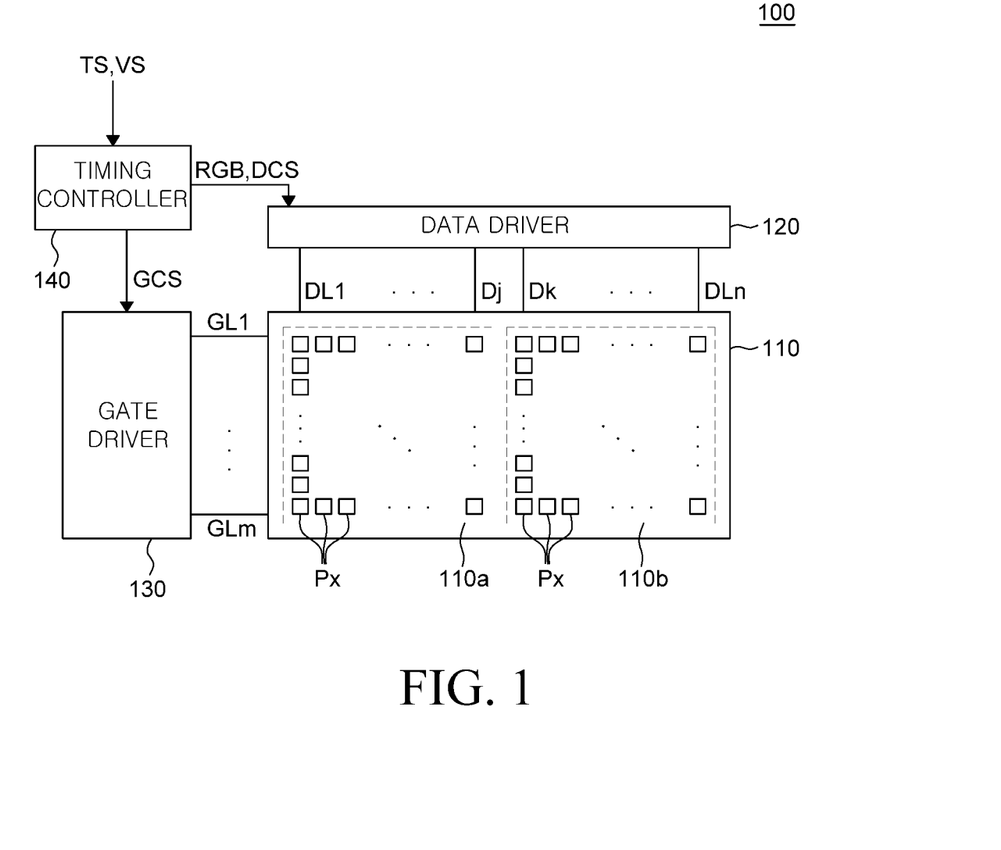
FIG. 1 is a block diagram for illustrating a display device according to an embodiment of the present disclosure.

FIG. 1 is a block diagram for illustrating a display device according to an embodiment of the present disclosure. All the components of the display device according to all embodiments of the present disclosure are operatively coupled and configured.

Referring to FIG. 1, a display device 100 includes a display panel 110, a data driver 120, a gate driver 130, and a timing controller 140.

On the display panel 110, a plurality of gate lines GL1 to GLm and a plurality of data lines DL1 to DLn are formed in a matrix on a substrate made of glass or plastic. A plurality of pixels Px are defined each at the respective one of the intersections of the gate lines GL1 to GLm and the data lines DL1 to DLn. Below, n and m are preferably positive values, e.g., integers.

Each of the pixels Px of the display panel 110 can include at least one thin-film transistor. The gate electrode of the thin-film transistor is connected to the gate line GL, and the source electrode thereof is connected to the data line DL.

When the display device 100 according to the embodiment of the present disclosure is an organic light-emitting display device, current is applied to an organic light-emitting diode disposed in each of the pixels Px, such that the discharged electrons and holes combine to generate excitons. The excitons emit light to realize the grayscale of the organic light-emitting display device.

As described above, the display device 100 according to the embodiment of the present disclosure is not limited to the organic light-emitting display device but can be any of various display devices.

The display panel 110 can include a plurality of display areas. Specifically, the display panel 110 includes a left-eye display area 110a disposed on the left side of the display panel 110 to display videos to the left eye LE of a viewer, and a right-eye display area 110b disposed on the right side of the display panel 110 to display videos to the right eye RE of the viewer. It is to be noted that the video output to the left-eye display area 110a and the video output to the right-eye display area 110b are basically output based on the same original video. In addition, to provide a viewer with more realistic virtual reality experience, the video output to the left-eye display area 110a and the video output to the right-eye display area 110b can be obtained by performing slightly different correction processes on the original video.

In the example shown in FIG. 1, the display device 100 of a single display type is shown, in which the left-eye display area 110a and the right-eye display area 110b are disposed on a single display panel 110. It is, however, to be understood that the present disclosure is not limited thereto. The display device 100 can be of a dual display type, which includes a display panel including the left-eye display area and a display panel including the right-eye display area.

A plurality of pixels Px can be arranged in each of the left-eye display area 110a and the right-eye display area 110b. The pixels Px are arranged in a row direction and a column direction, i.e., in a matrix.

Then, the pixels Px of the display panel 110 are connected to the gate lines GL1 to GLm and the data lines DL1 to DLn, respectively. Specifically, the pixels Px arranged in the left-eye display area 110a are connected to the first data line DL1 to the $j^{th}$ data line DLj, respectively, and the pixels Px arranged in the right-eye display area 110b Px are connected to the $k^{th}$ data line DLk to the $n^{th}$ data line DLn. The pixels Px are configured to operate based on gate voltage transmitted from the gate lines GL1 to GLm and data voltage transmitted from the data lines DL1 to DLn.

Each of the pixels Px can include a plurality of sub-pixels, and each of the sub-pixels can produce light of a particular color. For example, the plurality of sub-pixels can include, but are not limited to, a red sub-pixel that emits red light, a green sub-pixel that emits green light, and a blue sub-pixel that emits blue light.

The timing controller 140 starts the scanning according to timing implemented in each frame based on a timing signal TS received from an external host system. In addition, the timing controller 140 converts a video signal VS received from the external host system into a data signal format that can be processed by the data driver 120 and outputs video data RGB. Thus, the timing controller 140 controls the data driving at an appropriate time according to the scanning.

It is to be noted that the frequency of the video data RGB is lower than the frequency of the video signal VS. The conversion from the video signal VS into the video data RGB will be described later with reference to FIG. 3.

The timing controller 140 receives from an external host system a variety of timing signals TS including a vertical synchronization signal Vsync, a horizontal synchronization signal Hsync, a data enable signal DE and a data clock signal DCLK in addition to the video signal VS.

In order to control the data driver 120 and the gate driver 130, the timing controller 140 receives the timing signals TS such as the vertical synchronization signal Vsync, the horizontal synchronization signal Hsync, the data enable signal DE and the data clock signal DCLK and generates various control signals DCS and GCS to output them to the data driver 120 and the gate driver 130.

For example, in order to control the gate driver 130, the timing controller 140 outputs a variety of gate control signals (GCSs) including a gate start pulse (GSP), a gate shift clock (GSC), a gate output enable signal (GOE), etc.

The gate start pulse is used to control the operation start timing of one or more gate circuits of the gate driver 130. The gate shift clock is a clock signal commonly input to the one or more gate circuits, and is used to control the shift timing of the scan signal (gate pulse). The gate output enable signal specifies timing information of the one or more gate circuits.

In addition, in order to control the data driver 120, the timing controller 140 outputs a variety of data control signals (DCSs) including a source start pulse (SSP), a source sampling clock (SSC), a source output enable signal (SOE), etc.

The source start pulse is used to control the data sampling start timing of one or more data circuits of the data driver 120. The source sampling clock is a clock signal that is used to control the sampling timing of data in each data circuit. The source output enable signal controls the output timing of the data driver 120.

The timing controller 140 can be disposed on a control printed circuit board connected to a PCB to which the data driver 120 is bonded through a connection medium such as a flexible flat cable (FFC) and a flexible printed circuit (FPC).

The control printed circuit board can further include a power controller for supplying or controlling a variety of voltages to the display panel 110, the data driver 120, the gate driver 130, and the like. The power controller can be referred to as a power management IC (PMIC).

The source printed circuit board and the control printed circuit board described above can be implemented as a single printed circuit board.

The gate driver 130 supplies the gate voltage of on- or off-value to the gate lines GL1 to GLm sequentially under the control of the timing controller 140.

The gate driver 130 can be located only on one side or on both sides of the display panel 110, depending on the driving manner.

The gate driver 130 can be connected to a bonding pad of the display panel 110 by tape automated bonding (TAB) or chip-on-glass (COG) technology or can be formed directly on the display panel 110 by gate-in-panel (GIP) technology. In some implementations, the gate driver 130 can be integrated with the display panel 110.

The gate driver 130 can include a shift register, a level shifter, etc.

The data driver 120 converts the video data RGB received from the timing controller 140 into analog data voltage and outputs it to the data lines DL1 to DLn.

The data driver 120 can be connected to a bonding pad of the display panel 110 by tape automated bonding (TAB) or chip-on-glass (COG) technology or can be disposed directly on the display panel 110. In some implementations, the data driver 120 can be integrated with the display panel 110.

In addition, the data driver 120 can be implemented by chip-on-film (COF) technology. When chip-on-film (COF) technology is employed, one end of the data driver 120 can be bonded to at least one source printed circuit board, and the other end thereof can be bonded to the display panel 110.

The data driver 120 can include a logic part including various circuits such as a level shifter and a latch, a digital-to-analog converter (DAC), an output buffer, etc.

Figure 2:
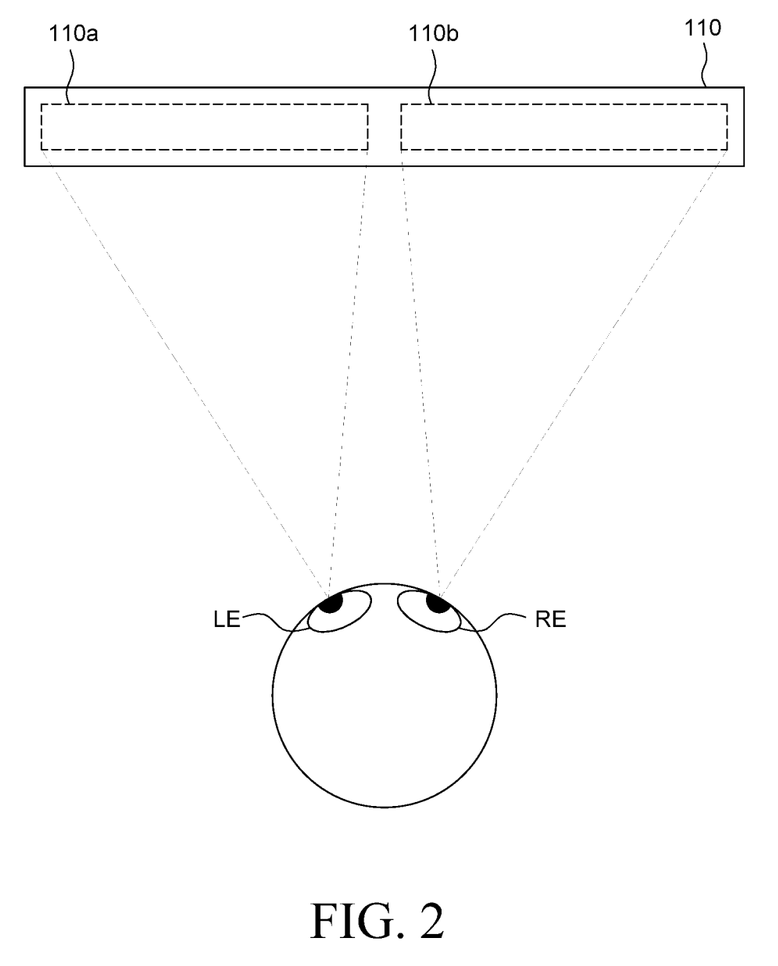
FIG. 2 is a diagram for illustrating a left-eye display area and a right-eye display area of a display device according to an embodiment of the present disclosure.

FIG. 2 is a diagram for illustrating a left-eye display area and a right-eye display area of a display device according to an embodiment of the present disclosure.

In particular, as shown in FIG. 2, when the display device 100 is of a single-display type in which the left-eye display area 110a and the right-eye display area 110b are disposed in the single display panel 110, a data voltage is applied to all the data lines DL1 to DLn by one data driver 120. In addition, as described above, when the display device 110 is of a dual display type which includes the display panel for the left-eye display area 110a and the display panel for the right-eye display area 110b, the data driver 120 can also be separated into a first data driver for outputting first data voltage to the left-eye display area 110a to drive it, and a second data driver for outputting second data voltage to the right-eye display area 110b to drive it. It is, however, to be understood that the present disclosure is not limited thereto.

Figure 3:
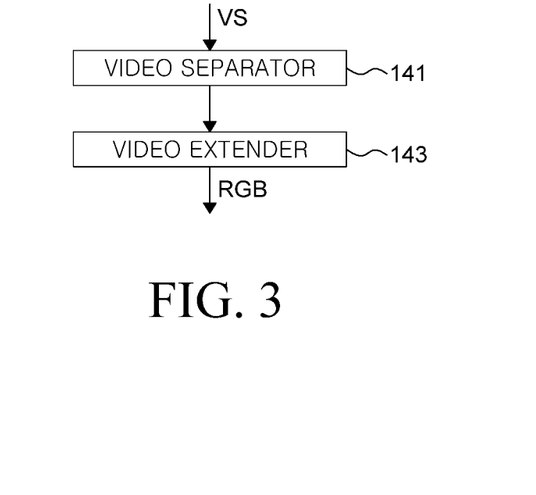
FIG. 3 is a block diagram for illustrating a timing controller of a display device according to an embodiment of the present disclosure.
Figure 4:
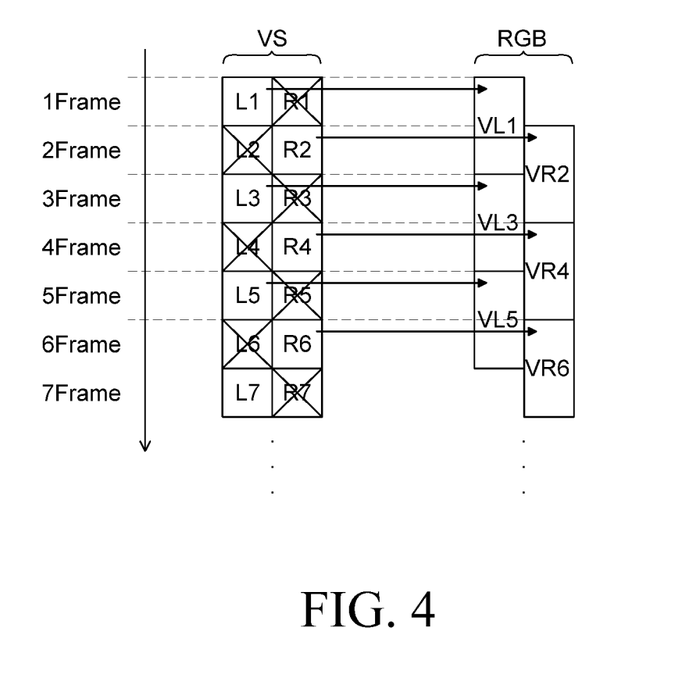
FIG. 4 is a diagram for illustrating a scheme of driving a timing controller of a display device according to an embodiment of the present disclosure.

FIG. 3 is a block diagram for illustrating a timing controller of a display device according to an embodiment of the present disclosure. FIG. 4 is a diagram for illustrating a scheme of driving the timing controller of the display device according to this embodiment of the present disclosure.

Hereinafter, the timing controller of the display device according to the embodiment of the present disclosure will be described with reference to FIGS. 3 and 4.

As shown in FIG. 3, the timing controller 140 of the display device 100 according to the embodiment of the present disclosure includes a video separator 141 that separates video signals VS into sub-video signals, and a video extender 143 that extends the separated video signals VS. Accordingly, the timing controller 140 receives the video signals VS and outputs video data RGB with a frequency lower than the frequency of the video signals VS.

The video separator 141 separates the video signals applied from an external host system into first video signals L1 to L7 output to the left-eye display area 110a and second video signals R1 to R7 output to the right-eye display area 110b.

For example, when the frequency of the video signal VS applied to the timing controller 140 of the display device according to the embodiment of the present disclosure is 120 Hz, the video separator 141 separates the video signal VS of 120 Hz into the first video signals L1 to L7 of 120 Hz and the second video signals R1 to R7 of 120 Hz.

Specifically, as shown in FIG. 4, the video signals VS are separated into the first video signals L1 to L7 and the second video signals R1 to R7 for the first to seventh frames, respectively.

In addition, the video extender 143 extracts the first video signals L1, L3, L5 and L7 and the second video signals R2, R4 and R6 in some frames from among the first video signals L1 to L7 and the second video signals R1 to R7 of a plurality of frames, and extends the extracted first video signals L1, L3, L5 and L7 and the second video signals R2, R4 and R6 in the some frames, to generate first video data VL1, VL3 and VL5 output to the left-eye display area 110a and second video data VR2, VR4 and VR6 output to the right-eye display area 110b.

That is to say, the video extender 143 extends one of the first video signals L1 to L7 of the $n^{th}$ frame to output the respective one of the first video data VL1, VL3 and VL5 of the $n^{th}$ frame and the $(n+1)^{th}$ frame. In addition, the video extender 143 extends one of the second video signals R1 to R7 of the $(n+1)^{th}$ frame to output the respective one of the second video data VR2, VR4 and VR6 of the $(n+1)^{th}$ frame to the $(n+2)^{th}$ frame.

Specifically, as shown in FIG. 4, the first video signal L1 of the first frame is extended to generate first video data VL1 output during the first frame and the second frame. The second video data R2 of the second frame is extended to generate the second video data VR2 output during the second frame and the third frame.

Similarly, the first video signal L3 of the third frame is extended to generate first video data VL3 output during the third frame and the fourth frame. The second video data R4 of the fourth frame is extended to generate the second video data VR4 output during the fourth frame and the fifth frame.

That is to say, the frames of the first video signals L1, L3, L5 and L7 which are used to generate the first video data VL1, VL3 and VL5 are different from the frames of the second video signals R2, R4 and R5 which are used to generate the second video data VR2, VR4 and VR6.

In this way, the video extender 143 extends the first video signals L1 to L7 and the second video signals R1 to R7 to thereby generate the first video data VL1, VL3 and VL5 and the second video data VR2, VR4 and VR6, so that the frequency of the first video data VL1, VL3 and VL5 and the second video data VR2, VR4 and VR6 can become lower than the frequency of the first video signals L1 to L7 and the second video signals R1 to R7.

More specifically, the frequency of the first video signals L1 to L7 and the second video signals R1 to R7 can be twice the frequency of the first video data VL1, VL3 and VL5 and the second video data VR2, VR4 and VR6.

Although the frequency is reduced by ½ in the above-described embodiment, this is merely illustrative. The video extender 143 can extract the first video signals L1, L3, L5 and L7 and the second video signal R2, R4 and R6 of some frames from among the first video signals L1 to L7 and the second video signal R1 to R7 in the frames and extend them, so that the frequency of the first video data VL1, VL3 and VL5 and the second video data VR2, VR4 and VR6 is 1/n of the frequency of the first video signals L1 to L7 and the second video signals R1 to R7, where n is a natural number greater than one.

As such, the video data RGB having a frequency lower than the frequency of the video signals VS applied from an external host system is output, so that the driving frequency of the data driver receiving the video data RGB can be reduced as well. As a result, even through the display device is driven at a low frequency, a video quality comparable to that achieved by the display device driven at a high frequency can be perceived.

Figure 5:
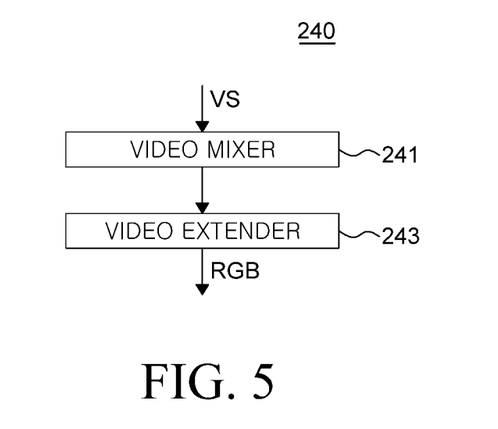
FIG. 5 is a block diagram for illustrating a timing controller of a display device according to another embodiment of the present disclosure.
Figure 6:
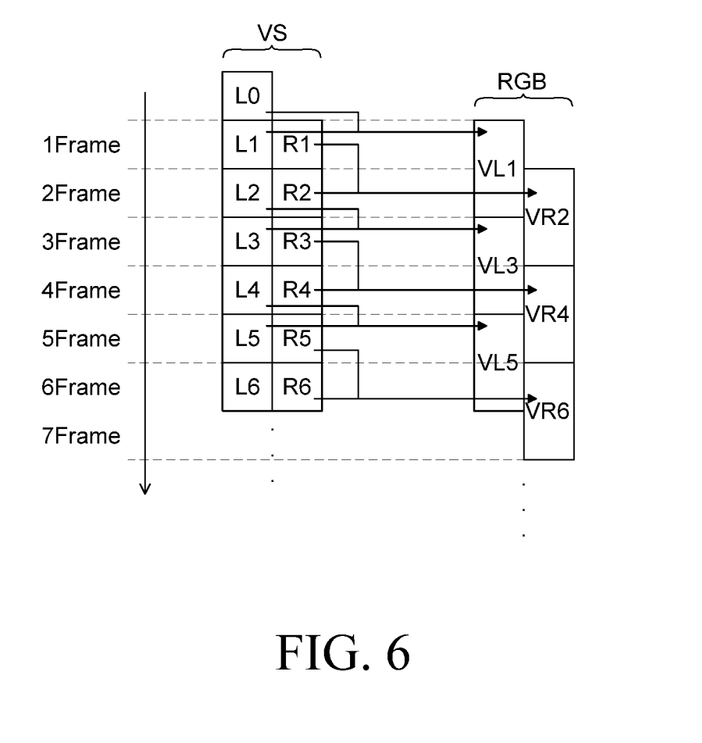
FIG. 6 is a diagram for illustrating a scheme of driving a timing controller according to another embodiment of the present disclosure.

FIG. 5 is a block diagram illustrating a timing controller of a display device according to another embodiment of the present disclosure. FIG. 6 is a diagram for illustrating a scheme of driving the timing controller according to this embodiment of the present disclosure.

Hereinafter, the timing controller of the display device according to another embodiment of the present disclosure will be described with reference to FIGS. 5 and 6.

As shown in FIG. 5, a timing controller 240 of a display device according to another embodiment of the present disclosure includes a video mixer 241 that mixes video signals VS, and a video extender 243 that extends the mixed video signals VS. Accordingly, the timing controller 240 receives the video signals VS and outputs video data RGB with a frequency lower than the frequency of the video signals VS. The timing controller 240 can replace the timing controller 140 in the display device of FIG. 1.

The video mixer 241 separates the video signals applied from an external host system into first video signals L1 to L7 output to the left-eye display area 110a and second video signals R1 to R7 output to the right-eye display area 110b, and mixes the first video signals L1 to L7 of a plurality of frames into the first video signal of a single frame, and the second video signals R1 to R7 of the plurality of frames into the second video signal of a single frame.

Specifically, when the frequency of the video signals VS applied to the timing controller 240 of the display device according to the embodiment of the present disclosure is 120 Hz, the video mixer 241 separates the video signal VS of 120 Hz into the first video signals L1 to L7 of 120 Hz and the second video signals R1 to R7 of 120 Hz, mixes the first video signals L1 to L7 output to the left-eye display area 110a during a plurality of frames among 120 frames, and mixes the second video signals R1 to R7 output to the right-eye display area 110b during a plurality of frames among the 120 frames.

Specifically, as shown in FIG. 6, the video mixer 241 separates the video signals VS into the first video signals L1 to L7 and the second video signals R1 to R7 for the first to seventh frames, respectively, and mixes the first video signals L1 to L7 of two frames and the second video signals R1 to R7 of two frames.

Then, the video extender 243 extends the mixed first video signals L1 to L7 to generate the first video data VL1, VL3 and VL5 output to the left-eye display area 110a, and extends the second video signals R1 to R7 to generate the second video data VR2, VR4 and VR6 output to the right-eye display area 110b.

That is to say, the video extender 243 extends the mixed video signal of the first video signals L1 to L7 of the $n^{th}$ frame and the $(n+1)^{th}$ frame to output the first video data VL1, VL3 and VL5 of the $(n+1)^{th}$ frame and the $(n+2)^{th}$ frame. In addition, the video extender 243 extends the mixed video signal of the second video signals R1 to R7 of the $(n+1)^{th}$ frame and the $(n+2)^{th}$ frame to output the second video data VR2, VR4 and VR6 of the $(n+2)^{th}$ frame and the $(n+3)^{th}$ frame.

Specifically, as shown in FIG. 6, by extending a mixed video signal of the first video signal L0 of the dummy frame and the first video signal L1 of the first frame, the first video data VL1 is generated which is output during the first frame and the second frame. By extending a mixed video signal of the second video signal R1 of the first frame and the second video signal R2 of the second frame, the second video data VR2 is generated which is output during the second frame and the third frame.

Similarly, by extending a mixed video signal of the first video signal L2 of the second frame and the first video signal L3 of the third frame, the first video data VL3 is generated which is output during the third frame and the fourth frame. By extending a mixed video signal of the second video signal R3 of the third frame and the fourth video signal R4 of the fourth frame, the second video data VR4 is generated which is output during the fourth frame and the fifth frame.

That is to say, the frames of the first video signals L1 to L7 which are used to generate the first video data VL1, VL3 and VL5 overlap with the frames of the second video signals R1 to R7 which are used to generate the second video data VR2, VR4 and VR6.

In this way, the video extender 243 extends the mixed first video signals L1 to L7 and the mixed second video signals R1 to R7 to thereby generate the first video data VL1, VL3 and VL5 and the second video data VR2, VR4 and VR6, so that the frequency of the first video data VL1, VL3 and VL5 and the second video data VR2, VR4 and VR6 can become lower than the frequency of the first video signals L1 to L7 and the second video signals R1 to R7.

More specifically, the frequency of the first video signals L1 to L7 and the second video signals R1 to R7 can be twice the frequency of the first video data VL1, VL3 and VL5 and the second video data VR2, VR4 and VR6.

Although the frequency is reduced by ½ in the above-described embodiment, this is merely illustrative. The video extender 243 can extend the mixed video signals of the first video signals L1 to L7 and the second video signal R1 to R7 of some frames, so that the frequency of the first video data VL1, VL3 and VL5 and the second video data VR2, VR4 and VR6 can be 1/n of the frequency of the first video signals L1 to L7 and the second video signals R1 to R7, where n is a natural number greater than one.

As such, the video data RGB having a frequency lower than the frequency of the video signals VS applied from an external host system is output, so that the driving frequency of the data driver receiving the video data RGB can be reduced as well. As a result, even through the display device is driven at a low frequency, a video quality comparable to that achieved by the display device driven at a high frequency can be perceived.

Figure 7:
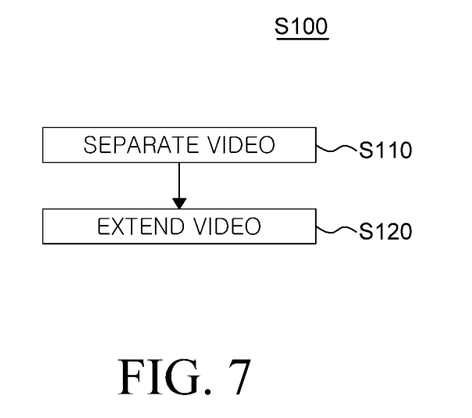
FIG. 7 is a flowchart for illustrating a method of driving a display device according to an embodiment of the present disclosure.

FIG. 7 is a flowchart for illustrating a method of driving a display device according to an embodiment of the present disclosure. This method may be implemented in any suitable display device of the present disclosure.

As shown in FIG. 7, the method of driving the display device according to an embodiment of the present disclosure includes separating video signals VS (step S110), and extending the separated video signals VS (step S120). Accordingly, the video signals VS are converted into video data RGB with a frequency lower than the frequency of the video signals VS.

In step S110, the video signal VS are separated into first video signals L1 to L7 output to the left-eye display area 110a and second video signals R1 to R7 output to the right-eye display area 110b.

That is to say, when the frequency of the video signal VS is 120 Hz, in step S110, the video signals VS of 120 Hz are separated into the first video signals L1 to L7 of 120 Hz and the second video signals R1 to R7 of 120 Hz.

Specifically, as shown in FIG. 4, the video signals VS are separated into the first video signals L1 to L7 and the second video signals R1 to R7 for the first to seventh frames, respectively.

Subsequently, in step S120, the first video signals L1, L3, L5 and L7 and the second video signals R2, R4 and R6 in some frames are extracted from among the first video signals L1 to L7 and the second video signals R1 to R7 of a plurality of frames, and the extracted first video signals L1, L3, L5 and L7 and the second video signals R2, R4 and R6 in the some frames are extended, to generate first video data VL1, VL3 and VL5 output to the left-eye display area 110a and second video data VR2, VR4 and VR6 output to the right-eye display area 110b.

That is to say, in step S120, one of the first video signals L1 to L7 of the $n^{th}$ frame is extended to generate the respective one of the first video data VL1, VL3 and VL5 of the $n^{th}$ frame and the $(n+1)^{th}$ frame. In addition, one of the second video signals R1 to R7 of the $(n+1)^{th}$ frame is extended to generate the respective one of the second video data VR2, VR4 and VR6 of the $(n+1)^{th}$ frame and the $(n+2)^{th}$ frame.

Specifically, as shown in FIG. 4, the first video signal L1 of the first frame is extended to generate first video data VL1 output during the first frame and the second frame. The second video data VR2 of the second frame is extended to generate the second video data VR2 output during the second frame and the third frame.

Similarly, the first video signal L3 of the third frame is extended to generate first video data VL3 output during the third frame and the fourth frame. The second video data R4 of the fourth frame is extended to generate the second video data VR4 output during the fourth frame and the fifth frame.

That is to say, the frames of the first video signals L1, L3, L5 and L7 which are used to generate the first video data VL1, VL3 and VL5 are different from the frames of the second video signals R2, R4 and R5 which are used to generate the second video data VR2, VR4 and VR6.

In this way, in step S120, the first video signals L1 to L7 and the second video signals R1 to R7 are extended to thereby generate the first video data VL1, VL3 and VL5 and the second video data VR2, VR4 and VR6, so that the frequency of the first video data VL1, VL3 and VL5 and the second video data VR2, VR4 and VR6 can become lower than the frequency of the first video signals L1 to L7 and the second video signals R1 to R7.

More specifically, the frequency of the first video signals L1 to L7 and the second video signals R1 to R7 can be twice the frequency of the first video data VL1, VL3 and VL5 and the second video data VR2, VR4 and VR6.

Although the frequency is reduced by ½ in the above-described embodiment, this is merely illustrative. In step S120, the first video signals L1, L3, L5 and L7 and the second video signal R2, R4 and R6 of some frames can be extracted from among the first video signals L1 to L7 and the second video signal R1 to R7 in the frames and extended, so that the frequency of the first video data VL1, VL3 and VL5 and the second video data VR2, VR4 and VR6 is 1/n of the frequency of the first video signals L1 to L7 and the second video signals R1 to R7, where n is a natural number greater than one.

As such, according to the method of driving a display device S100 according to the embodiment of the present disclosure, the video data RGB having a frequency lower than the frequency of the video signals VS is output, so that the driving frequency of the data driver receiving the video data RGB can be reduced as well. As a result, even through the display device is driven at a low frequency, a video quality comparable to that achieved by the display device driven at a high frequency can be perceived.

Figure 8:
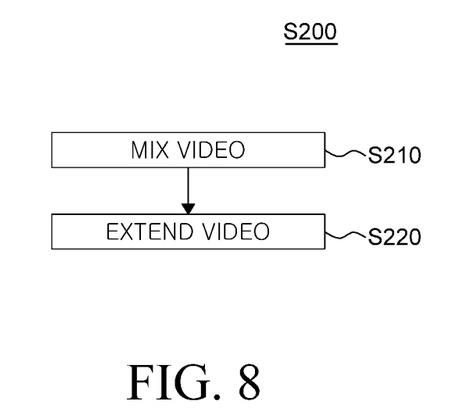
FIG. 8 is a flowchart for illustrating a method of driving a display device according to another embodiment of the present disclosure.

FIG. 8 is a flowchart for illustrating a method of driving a display device according to another embodiment of the present disclosure. This method may be implemented in any suitable display device of the present disclosure.

As shown in FIG. 8, the method of driving the display device according to an embodiment of the present disclosure includes mixing video signals VS (step S210), and extending the mixed video signals VS (step S220). Accordingly, video data RGB with a frequency lower than the frequency of the video signals VS is generated.

In step S210, the video signals are separated into first video signals L1 to L7 output to the left-eye display area 110a and second video signals R1 to R7 output to the right-eye display area 110b, and mixes the first video signals L1 to L7 of a plurality of frames into the first video signal of a single frame, and the second video signals R1 to R7 of the plurality of frames into the second video signal of a single frame.

That is to say, when the frequency of the video signals VS applied to the timing controller 240 of the display device according to the embodiment of the present disclosure is 120 Hz, in step S210, the video signals VS of 120 Hz are separated into the first video signals L1 to L7 of 120 Hz and the second video signals R1 to R7 of 120 Hz, the first video signals L1 to L7 output to the left-eye display area 110a during a plurality of frames among 120 frames are mixed, and the second video signals R1 to R7 output to the right-eye display area 110b during a plurality of frames among the 120 frames are mixed.

Specifically, as shown in FIG. 6, the video mixer 241 separates the video signals VS into the first video signals L1 to L7 and the second video signals R1 to R7 for the first to seventh frames, respectively, and mixes the first video signals L1 to L7 and the second video signals R1 to R7 of two frames.

Then, in step S220, the mixed video signals of the first video signals L1 to L7 and the second video signals R1 to R7 are extended, so that the first video data VL1, VL3 and VL5 output to the left-eye display area 110a and the second video data VR2, VR4 and VR6 output to the right-eye display area 110b are generated.

That is to say, in step S220, the mixed video signal of the first video signals L1 to L7 of the $n^{th}$ frame and the $(n+1)^{th}$ frame is extended to output the first video data VL1, VL3 and VL5 of the $(n+1)^{th}$ frame and the $(n+2)^{th}$ frame. In addition, the mixed video signal of the second video signals R1 to R7 of the $(n+1)^{th}$ frame and the $(n+2)^{th}$ frame is extended to output the second video data VR2, VR4 and VR6 of the $(n+2)^{th}$ frame and the $(n+3)^{th}$ frame.

Specifically, as shown in FIG. 6, by extending a mixed video signal of the first video signal L0 of the dummy frame and the first video signal L1 of the first frame, the first video data VL1 is generated which is output during the first frame and the second frame. By extending a mixed video signal of the second video signal R1 of the first frame and the second video signal R2 of the second frame, the second video data VR2 is generated which is output during the second frame and the third frame.

Similarly, by extending a mixed video signal of the first video signal L2 of the second frame and the first video signal L3 of the third frame, the first video data VL3 is generated which is output during the third frame and the fourth frame. By extending a mixed video signal of the second video signal R3 of the third frame and the fourth video signal R4 of the fourth frame, the second video data VR4 is generated which is output during the fourth frame and the fifth frame.

That is to say, the frames of the first video signals L1 to L7 which are used to generate the first video data VL1, VL3 and VL5 overlap with the frames of the second video signals R1 to R7 which are used to generate the second video data VR2, VR4 and VR6.

In this way, in step S220, the mixed video signals of the first video signals L1 to L7 and the mixed second video signals R1 to R7 are extended to thereby generate the first video data VL1, VL3 and VL5 and the second video data VR2, VR4 and VR6, so that the frequency of the first video data VL1, VL3 and VL5 and the second video data VR2, VR4 and VR6 can become lower than the frequency of the first video signals L1 to L7 and the second video signals R1 to R7.

More specifically, the frequency of the first video signals L1 to L7 and the second video signals R1 to R7 can be twice the frequency of the first video data VL1, VL3 and VL5 and the second video data VR2, VR4 and VR6.

Although the frequency is reduced by ½ in the above-described embodiment, this is merely illustrative. In step S220, the mixed video signals of the first video signals L1 to L7 and the second video signal R1 to R7 of some frames can be extended, so that the frequency of the first video data VL1, VL3 and VL5 and the second video data VR2, VR4 and VR6 can be 1/n of the frequency of the first video signals L1 to L7 and the second video signals R1 to R7, where n is a natural number greater than one.

As such, according to the method of driving a display device S200 according to another embodiment of the present disclosure, the video data RGB having a frequency lower than the frequency of the video signals VS is output, so that the driving frequency of the data driver receiving the video data RGB can be reduced as well. As a result, even through the display device is driven at a low frequency, a video quality comparable to that achieved by the display device driven at a high frequency can be perceived.

The embodiments of the present disclosure can also be described as follows.

According to an aspect of the present disclosure, there is provided a display device including a display panel having a left-eye display area and a right-eye display area, and a timing controller configured to receive video signals having a first frequency to generate video data having a second frequency. The second frequency is lower than the first frequency.

The timing controller can comprise a video separator configured to separate the video signals into first video signals to be output to the left-eye display area and second video signals to be output to the right-eye display area, and a video extender configured to extend the first video signals to generate first video data to be output to the left-eye display area and to extend the second video signals to generate second video data to be output to the right-eye display area.

The video extender can extend the first video signal of an $n^{th}$ frame to generate first video data for the $n^{th}$ frame and an $(n+1)^{th}$ frame, and extends the second video signal of the $(n+1)^{th}$ frame to generate the second video data for the $(n+1)^{th}$ frame and an $(n+2)^{th}$ frame.

The timing controller can comprise a video mixer configured to mix first video signals to be output to the left-eye display area during a plurality of frames and to mix second video signals to be output to the right-eye display area during the plurality of frames, and a video extender configured to extend the mixed first video signals to generate first video data to be output to the left-eye display area and to extend the mixed second video signals to generate second video data to be output to the right-eye display area.

The video extender can extend the mixed first video signal of the first video signal of the $n^{th}$ frame and the first video signal of the $(n+1)^{th}$ frame to generate the first video data for the $(n+1)^{th}$ frame and the $(n+2)^{th}$ frame, and extends the mixed second video signal of the second video signal of the $(n+1)^{th}$ frame and the second video signal of the $(n+2)^{th}$ frame to generate the second video data for the $(n+2)^{th}$ frame and the $(n+3)^{th}$ frame.

The display device can further comprise a data driver configured to receive the first video data and to output a first data voltage to the left-eye display area, and to receive the second video data and to output a second data voltage to the right-eye display area.

According to another aspect of the present disclosure, there is provided a method of driving a display device including separating video signals applied from an external system into first video signals to be output to a left-eye display area and second video signals to be output to a right-eye display area, and extending the first video signals to generate first video data to be output to the left-eye display area and extending the second video signals to generate second video data to be output to the right-eye display area.

The extending the first and second video signals can comprise extending the first video signal of an nth frame to generate the first video data for the nth frame and an $(n+1)^{th}$ frame, and extending the second video signal of the $(n+1)^{th}$ frame to generate the second video data for the $(n+1)^{th}$ frame and an $(n+2)^{th}$ frame.

According to another aspect of the present disclosure, there is provided a method of driving a display device including mixing first video signals to be output to the left-eye display area during a plurality of frames, and mixing second video signals to be output to the right-eye display area during the plurality of frames, and extending the mixed first video signals to generate first video data to be output to the left-system display area, and extending the mixed second video signals to generate second video data to be output to the right-eye display area.

The extending the mixed first and second video signals can comprise extending the mixed first video signal of the first video signal of the $n^{th}$ frame and the first video signal of the $(n+1)^{th}$ frame to generate the first video data for the $(n+1)^{th}$ frame and the $(n+2)^{th}$ frame, and extending the mixed second video signal of the second video signal of the $(n+1)^{th}$ frame and the second video signal of the $(n+2)^{th}$ frame to generate the second video data for the $(n+2)^{th}$ frame and the $(n+3)^{th}$ frame.

Although the embodiments of the present disclosure have been described in detail with reference to the accompanying drawings, the present disclosure is not limited thereto and can be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
 a display panel including a left-eye display area and a right-eye display area; and
 a timing controller configured to receive video signals having a first frequency to generate video data having a second frequency,
 wherein the timing controller comprises a video separator configured to separate the video signals into first video signals including a plurality of frames to be output to the left-eye display area and second video signals including a plurality of frames to be output to the right-eye display area and a video extender configured to extract odd-numbered frames or even-numbered frames among frames of the first video signals and to extract even-numbered frames or odd-numbered frames among frames of the second video signals such that the extracted frames of the second video signals are not overlapped with the extracted frames of the first video signals,
 wherein the video extender generates a first video data by extending the frames of the first video signals and a second video data by extending the frames of the second video signals and outputs the first video data and the second video data to the display panel,
 wherein the video extender extends the first video signal having a first frame rate, of an nth frame to generate the first video data having a second frame rate for the nth frame and an (n+1)th frame, and extends the second video signal having the first frame rate of an (n+1)th frame (in a case of extending the first video signal of the nth frame) to generate the second video data having the second frame rate for the (n+1)th frame and an (n+2)th frame, where n is an integer, and
 wherein the second frame rate is lower than the first frame rate.

2. The display device of claim 1, wherein the first video data is a video data corresponding to the extracted frame of the first video signal and the next frame of the extracted frame of the first video signal, and the second video data is a video data corresponding to the extracted frame of the second video signal and the next frame of the extracted framed of the second video signal.

3. The display device of claim 1, further comprising:
 a data driver configured to receive the first video data and to output a first data voltage to the left-eye display area, and receive the second video data and to output a second data voltage to the right-eye display area.

4. A method of driving a display device including a display panel including a left-eye display area and a right-eye display area; the method comprising:
 separating video signals applied from an external system into first video signals including a plurality of frames to be output to the left-eye display area and second video signals including a plurality of frames to be output to the right-eye display area using a video separator;
 extracting odd-numbered frames or even-numbered frames among frames of the first video signals and then extracting even-numbered frames or odd-numbered frames among frames of the second video signals such that the extracted frames of the second video signals are not overlapped with the extracted frames of the first video signals using a video extender;
 generating a first video data by extending the frames of the first video signals;
 generating a second video data by extending the frames of the second video signals,
 wherein the video extender extends the first video signal having a first frame rate of an nth frame to generate the first video data having a second frame rate for the nth frame and an (n+1)th frame, and extends the second video signal having the first frame rate of an (n+1)th frame (in a case of extending the first video signal of the nth frame) to generate the second video data having the second frame rate for the (n+1)th frame an (n+2)th frame, where n is an integer, and
 wherein the second frame rate is lower than the first frame rate; and outputting the first and the second video data to the display panel.

5. The method of claim 4, wherein the first video data is a video data corresponding to the extracted frame of the first video signal and the next frame of the extracted frame of the first video signal, and the second video data is a video data corresponding to the extracted frame of the second video signal and the next frame of the extracted framed of the second video signal.

6. A method of driving a display device including a display panel including a left-eye display area and a right-eye display area, the method comprising:
separating video signals applied from an external system into first video signals including a plurality of frames to be output to the left-eye display area and second video signals including a plurality of frames to be output to the right-eye display area;
mixing two frames of the first video signals with a frame and mixing two frames of the second video signals with a frame;
generating a first video data output to the left-eye display area and a second video data output to the right-eye display area by extending each of the mixed frames of the first video signals and the second video signals,
wherein the video extender extends the mixed video signal of the first video signals of an nth frame and an (n+1)th frame to output the first video data of the (n+1)th frame and an (n+2)th frame, and extends the mixed video signal of the second video signals of an (n+1)th frame and an (n+2)th frame (in a case of mixing the first video signals of the nth frame and an (n+1)th frame) to output the second video data of the (n+2)th frame and an (n+3)th frame; and
outputting the first and the second video data to the display panel.

7. The method of claim 6, wherein each of the frames of the first video data and the second video data are alternately output to the display panel.

8. A display device comprising:
a display panel including a left-eye display area and a right-eye display area; and
a timing controller configured to receive video signals having a first frequency to generate video data having a second frequency,
wherein the timing controller comprises a video mixer separating the video signals into first video signals including a plurality of frames to be output to the left-eye display area and second video signals including a plurality of frames to be output to the right-eye display area and then mixing two frames of the first video signals with a frame and mixing two frames of the second video signals with a frame, and a video extender generating a first video data output to the left-eye display area of the display panel and a second video data output to the right-eye display area of the display panel by extending each of the mixed frames of the first video signals and the second video signals,
wherein the video extender outputs the first and the second video data to the display panel,
wherein the video extender extends the mixed video signal of the first video signals of an nth frame and an (n+1)th frame to output the first video data of the (n+1)th frame and an (n+2)th frame, and extends the mixed video signal of the second video signals of an (n+1)th frame and an (n+2)th frame (in a case of mixing the first video signals of the nth frame and an (n+1)th frame) to output the second video data of the (n+2)th frame and an (n+3)th frame, and
wherein the second frequency is lower than the first frequency.

9. The display device of claim 8, wherein each of the frames of the first video data and the second video data are alternately output to the display panel.

10. The display device of claim 8, further comprising:
a data driver configured to receive the first video data and to output a first data voltage to the left-eye display area, and receive the second video data and to output a second data voltage to the right-eye display area.

* * * * *